United States Patent
Stienhans et al.

(10) Patent No.: US 8,250,215 B2
(45) Date of Patent: Aug. 21, 2012

(54) METHOD AND SYSTEM FOR INTELLIGENTLY LEVERAGING CLOUD COMPUTING RESOURCES

(75) Inventors: Frank Stienhans, San Carlos, CA (US); Michael Klimentiev, Belmont, CA (US)

(73) Assignee: SAP AG, Walldorf, DE (US)

( * ) Notice: Subject to any disclaimer, the term of this patent is extended or adjusted under 35 U.S.C. 154(b) by 553 days.

(21) Appl. No.: 12/190,360

(22) Filed: Aug. 12, 2008

(65) Prior Publication Data

US 2010/0042720 A1 Feb. 18, 2010

(51) Int. Cl.
*G06F 15/16* (2006.01)
*G06F 15/173* (2006.01)
(52) U.S. Cl. .......... 709/227; 709/223; 709/226
(58) Field of Classification Search ........... 709/204, 709/223, 226, 227
See application file for complete search history.

(56) References Cited

U.S. PATENT DOCUMENTS

| 5,764,915 A * | 6/1998 | Heimsoth et al. ............ 709/227 |
| 2003/0105810 A1* | 6/2003 | McCrory et al. ............. 709/203 |
| 2007/0226323 A1* | 9/2007 | Halpern ...................... 709/222 |
| 2008/0104245 A1* | 5/2008 | Romero ....................... 709/226 |
| 2009/0300149 A1* | 12/2009 | Ferris et al. ................. 709/222 |
| 2009/0300607 A1* | 12/2009 | Ferris et al. ................... 718/1 |

OTHER PUBLICATIONS

Amazon Web Services (TM) "Amazon Elastic Compute Cloud", Developer Guide, API Version Aug. 8, 2008.

* cited by examiner

*Primary Examiner* — Brian J Gillis
(74) *Attorney, Agent, or Firm* — Fountainhead Law Group PC (57) ABSTRACT

In one embodiment the present invention includes a multi-cloud management module having a plurality of cloud adapters. The multi-cloud management module provides a unified administrative interface for provisioning cloud-based resources on any one of several clouds for which a cloud adapter is configured for use with the multi-cloud management module. Each cloud adapter converts non-cloud-specific commands to cloud-specific provisioning commands for the cloud to which the cloud adapter is associated.

22 Claims, 5 Drawing Sheets

```
                    ┌─────────┐
                    │  BEGIN  │
                    └────┬────┘
                         │
                         ▼
┌──────────────────────────────────────────────────────┐
│  RECEIVE A REQUEST FOR A CLOUD-BASED COMPUTING       │
│  RESOURCE, THE REQUEST RECEIVED AT A MULTI-CLOUD     │
│  MANAGEMENT MODULE HAVING A PLURALITY OF CLOUD       │
│  ADAPTERS, EACH ADAPTER CONFIGURED TO CONVERT A      │
│  REQUEST INTO ONE OR MORE PROVISIONING COMMANDS      │
│  COMPATIBLE WITH A PARTICULAR CLOUD WITH WHICH THE   │
│  CLOUD ADAPTER IS ASSOCIATED                      72 │
└──────────────────────────┬───────────────────────────┘
                           ▼
┌──────────────────────────────────────────────────────┐
│  SELECT A CLOUD ADAPTER BASED ON THE RECEIVED        │
│  REQUEST, AND FORWARD THE REQUEST TO THE CLOUD       │
│  ADAPTER FOR PROCESSING                           74 │
└──────────────────────────┬───────────────────────────┘
                           ▼
┌──────────────────────────────────────────────────────┐
│  GENERATE, BASED ON THE REQUEST, ONE OR MORE         │
│  PROVISIONING COMMANDS COMPATIBLE WITH A SPECIFIC    │
│  CLOUD, AND SUFFICIENT TO DIRECT A CLOUD             │
│  MANAGEMENT MODULE OF THE SPECIFIC CLOUD TO          │
│  PROVISION THE REQUESTED RESOURCE                 76 │
└──────────────────────────┬───────────────────────────┘
                           ▼
┌──────────────────────────────────────────────────────┐
│  COMMUNICATE THE ONE OR MORE PROVISIONING COMMANDS   │
│  TO A CLOUD MANAGEMENT MODULE OF THE SPECIFIC CLOUD, │
│  THEREBY ENABLING THE CLOUD MANAGEMENT MODULE OF THE │
│  SPECIFIC CLOUD TO PROVISION THE REQUESTED CLOUD-    │
│  BASED COMPUTER RESOURCE FOR USE BY THE USER      78 │
└──────────────────────────┬───────────────────────────┘
                           ▼
                    ┌─────────┐
                    │   END   │
                    └─────────┘
```

METHOD AND SYSTEM FOR INTELLIGENTLY LEVERAGING CLOUD COMPUTING RESOURCES

CROSS REFERENCE TO RELATED APPLICATIONS

Not Applicable

BACKGROUND

The present invention relates to cloud computing, and in particular, to a method and system for intelligently leveraging cloud-based computing resources.

In general, the concept of "cloud computing" refers to the utilization of a set of shared computing resources (e.g., servers) which are typically consolidated in one or more data center locations. A cloud-based computing resource is thought to execute or reside somewhere on the "cloud", which may be an internal corporate network or the public Internet. From the perspective of an application developer or information technology administrator, cloud computing enables the development and deployment of applications that exhibit scalability (e.g., easily and dynamically increase or decrease resource utilization as needed), performance (e.g., execute efficiently and fast), and reliability (e.g., never, or at least rarely, fail), all without any regard for the nature or location of the underlying infrastructure.

A number of factors have given rise to an increase in the utilization of cloud computing resources. For example, advances in networking technologies have significantly improved resource connectivity while decreasing connectivity costs. Advances in virtualization technologies have increased the efficiency of computing hardware by improving scalability and making it possible to more closely match computing hardware resources to the requirements of a particular computing task. Additionally, virtualization technologies commonly deployed in cloud computing environments have improved application reliability by enabling failover policies and procedures that reduce or all together eliminate disruption due to an application or hardware failure.

Figure 1:
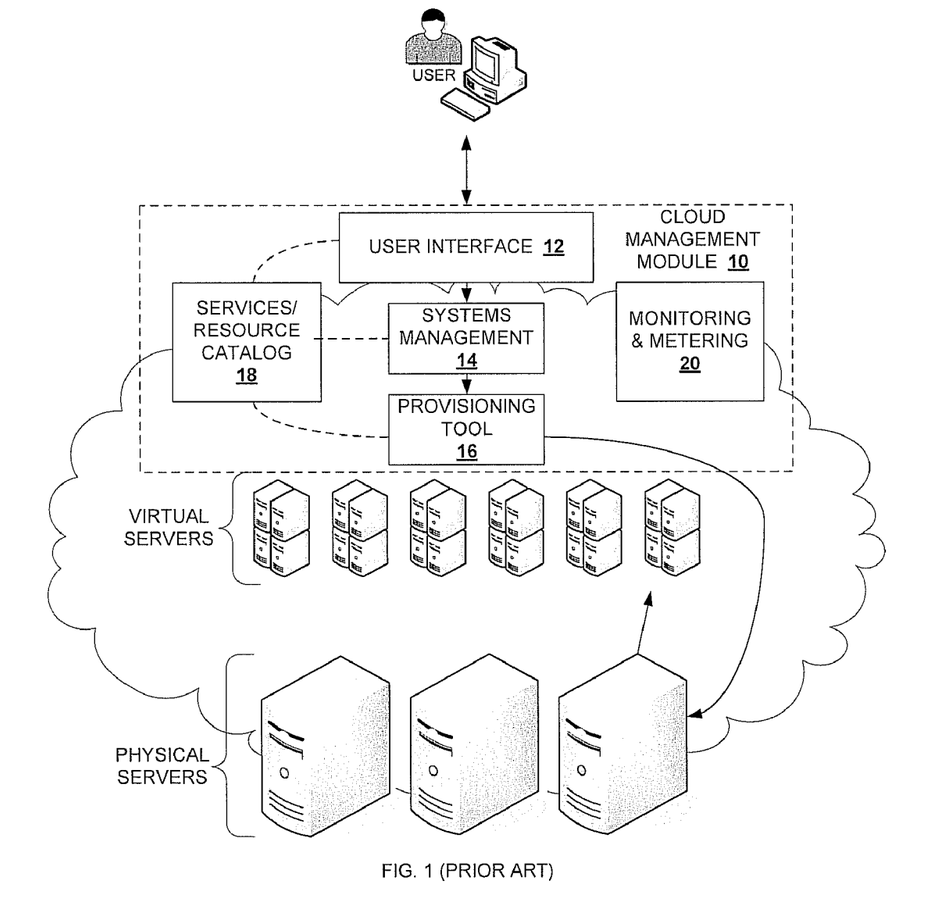
FIG. 1 illustrates a conventional cloud computing architecture, including a cloud management module for provisioning and configuring cloud-based resources.

Before a cloud computing resource can be accessed and/or utilized, typically a user must provision and/or configure the particular resource. For instance, in the case of a virtual server or virtual appliance, a user must configure the server or appliance and provision a physical server to execute the virtual server or appliance. FIG. 1 illustrates a typical cloud computing architecture including the logical components—collectively referred to herein as the cloud management module 10—utilized to provision and/or configure a virtual server or virtual appliance for use by a requesting user. As illustrated in FIG. 1, the cloud management module 10 includes a user interface component 12, a systems management component 14, and a provisioning component 16. The user interface component 12 may facilitate web-based access to various administrative functions thereby enabling the user to configure and provision the cloud-based resource using a conventional web browser application. For example, the user interface component 12 may operate in conjunction with a web/application server (not shown) and the services/resources catalog 18 to display to the user a list of resources or services that the user can provision and utilize, along with a list of commands (e.g., start, stop, suspend, list) that can be executed to operate on, or with, certain resources. The cloud-based resources may comprise, for example, a list of machine images corresponding to virtual servers that can be instantiated in the cloud. The systems management component 14 manages the available resources, including the physical servers. For example, after a user has uploaded a customized machine image or selected a pre-configured machine image during the initial provisioning stage, the systems management component 14 operates in conjunction with the provisioning tool 16 to generate the necessary commands for provisioning the virtual server on the appropriate physical server. When the cloud-based services are offered by a third-party, a monitoring and metering module 20 may be utilized to track the usage of the cloud so the resources utilized can be attributed to the appropriate resource consumer.

There are a number of problems with the existing tools and techniques for provisioning resources in a computing cloud. First, there are an increasing number of third-party service providers offering cloud computing services with different billing arrangements and no standard methods or techniques for configuring and provisioning the various services and/or resources. Consequently, a user seeking to provision, access and/or utilize two different cloud-based service offerings must become familiar with the various billing details, technical differences in the underlying services as well as the different administrative or management interfaces for the different service offerings. Additionally, conventional cloud management tools provide no easy way for a user to integrate remote cloud-based resources with existing corporate or enterprise infrastructure, including one or more locally-maintained clouds. Consequently, there exists a need for improved methods and systems for intelligently leveraging cloud computing resources.

SUMMARY

Embodiments of the present invention improve the manner in which cloud computing resources are provisioned and managed. In one embodiment the present invention includes a multi-cloud management module having a plurality of cloud adapters. The multi-cloud management module provides a unified administrative interface for provisioning cloud-based resources (e.g., servers, virtual machines, virtual servers and/or virtual appliances) on any one of several clouds for which a cloud adapter is configured for use with the multi-cloud management module. Each cloud adapter converts non-cloud-specific commands to cloud-specific provisioning commands for the cloud to which the cloud adapter is associated. Accordingly, when a cloud adapter receives a user-initiated request, the cloud adapter converts the received request to one or more provisioning commands compatible with the particular cloud to which that cloud adapter is associated. The generated provisioning commands, which are sufficient to direct a cloud management module of a particular cloud to provision the requested resource, are then communicated to the cloud management module of the cloud corresponding to the cloud adapter.

In another aspect of the invention, the multi-cloud management module enables a user to suspend a cloud-based computing resource associated with a first cloud, and resume the cloud-based computing resource (e.g., restore the state of the resource, such as a virtual server) on a second, different, cloud. This occurs with little administrative interaction on the part of the administrating user.

The following detailed description and accompanying drawings provide a better understanding of the nature and advantages of the present invention.

DETAILED DESCRIPTION

Described herein are techniques for intelligently leveraging cloud computing resources. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

In one aspect, the present invention provides a unified administrative interface for provisioning cloud-based computing resources on clouds with heterogeneous administrative interfaces. Accordingly, a user or administrator can utilize a common interface to configure and provision computer resources on any one of several clouds, regardless of whether the cloud is an enterprise-maintained cloud, or a third-party cloud. In addition, an embodiment of the invention enables an enterprise to utilize business logic to automate the decision making process regarding who is allowed to utilize certain cloud-based resources, and, when and under what conditions those resources are to be provisioned, accessed and/or utilized. Furthermore, an embodiment of the invention allows third-party cloud-based resources to be integrated with corporate or enterprise-maintained computing resources. Accordingly, a computing resource, such as a virtual server or virtual appliance, can be started or initiated on one cloud, suspended, and then resumed on another cloud, all requiring minimal interaction on the part of the user.

As used herein, a cloud is simply a set of shared computing resources (e.g., servers) which are consolidated in one or more data center locations. In general, the term cloud is used to describe the architecture of the various computing resources, as opposed to the business plan under which those resources may be offered. Accordingly, a cloud that is owned, maintained and operated by a corporate entity that is utilizing the cloud's computing resources is referred to as a corporate or enterprise-maintained cloud. A cloud operated by a third-party with computing resources provided to consumers on an on-demand basis is referred to herein as a third-party cloud. Those skilled in the art will appreciate the difference in the cost analysis between a corporate or enterprise-maintained cloud and a third-party cloud. A cloud-based computing resource is intended to included, but not be limited to: physical servers, virtual machines, virtual servers and/or virtual appliances.

Figure 2:
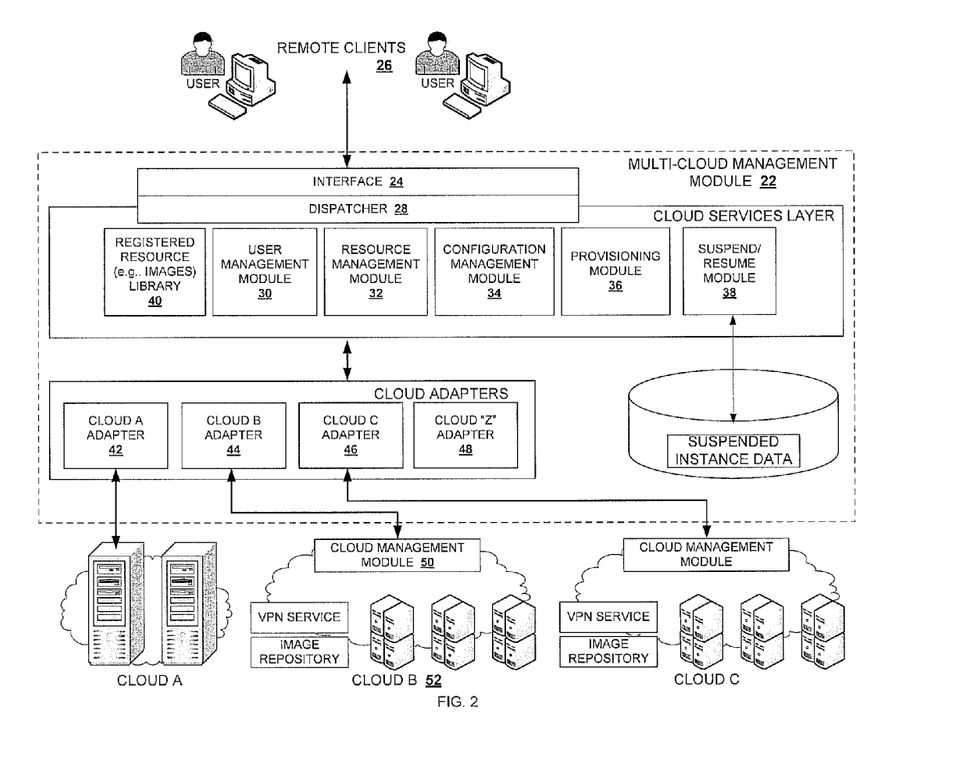
FIG. 2 illustrates a multi-cloud management module of an improved cloud computing architecture having a plurality of cloud adapters, according to an embodiment of the invention.

FIG. 2 illustrates a multi-cloud management module 22 of an improved cloud computing architecture having a plurality of cloud adapters 42, 44, 46, and 48, according to an embodiment of the invention. In contrast to a conventional cloud management module, the multi-cloud management module 22 of FIG. 2 enables a user to provision and configure computing resources from a plurality of potentially heterogeneous enterprise-maintained and third-party cloud-based service offerings. The cloud-based service offerings are heterogeneous in the sense that each cloud may have different administrative or provisioning interfaces implemented with different application programming interfaces (APIs). Additionally, the underlying virtualization software for each cloud may be different thereby requiring variations in the particular configuration settings and/or formats for the machine images upon which each instance of a virtual server or virtual appliance is based. In any case, the multi-cloud management module 22 of FIG. 2 provides a common administrative interface for provisioning resources (e.g., virtual servers or virtual appliances), whether the resource is associated with a server or group of servers owned and maintained by the enterprise, or the resource is associated with a server or group of servers made available by a third-party and accessed in an on-demand basis.

As illustrated in FIG. 2, the cloud management module 22 is depicted as a collection of functional blocks. Each functional block may be implemented as a separate software component, for example, using any number of conventional programming languages, including C, C+, Java, and so on. Furthermore, it will be appreciated by those skilled in the art that an embodiment of the invention may not require every functional block shown in FIG. 2, or may include additional functional blocks which have been left out of FIG. 2 to avoid obscuring the invention in unnecessary detail. The software code modules implementing the functional blocks and representing the multi-cloud management module 22 may reside and execute on a single server, or may be distributed in some meaningful manner to reside and execute on multiple servers. In one embodiment of the invention, for example, the code modules representing the multi-cloud management module 22 reside and execute on an enterprise-maintained server. However, in an alternative embodiment of the invention, the multi-cloud management module 22 may reside and execute in a cloud that is operated and maintained by a third-party.

The multi-cloud management module 22 includes an interface 24 configured to send and receive messages with one or more user clients 26. The interface 24 may be based on a service oriented architecture and have an application programming interface (API), for example. Accordingly, clients may communicate messages to the multi-cloud management module 22 using one or more conventional and well-know communication protocols, such as the hypertext transfer protocol (HTTP) or the simple object access protocol (SOAP). Furthermore, a client may be a conventional web browser application, such that the multi-cloud management module 22 provides a web-based graphical user interface for provisioning, configuring and administering the cloud-based resources. Alternatively, the user client 26 may consist of a software development application providing an integrated development environment and including a customized plug-in for accessing and communicating API-related messages to and from the multi-cloud management module 22. Other embodiments of the invention may utilize other task specific clients, such as testing tools, and so on.

In general, cloud-based resources are administered and provisioned as follows. A client user causes a message (e.g., a service request, or some other administrative request) to be communicated from a client to the interface of the multi-cloud management module 22. After the message is received at the interface 24, the message is analyzed by a dispatcher 28, processed by one or more processing modules (e.g., processing modules 30, 32, 34, 36, or 38), and then, if appropriate, the message is dispatched to a cloud adapter selected from a plurality of cloud adapters 42, 44, 46 and 48 available to the multi-cloud management module 22. As illustrated in FIG. 2, the multi-cloud management module 22 in this example includes four cloud adapters. However, in various embodiments of the invention, the multi-cloud management module 22 may include more or fewer cloud adapters.

Each cloud adapter is configured to receive and analyze a non-cloud-specific message, and then convert or translate the non-cloud-specific message into a cloud-specific message compatible with the cloud management module of the cloud with which the cloud adapter is associated. For example, a non-cloud-specific message dispatched to cloud adapter B (with reference no. 44) will be translated or converted to a cloud-specific message compatible with the cloud management module 50 of cloud B (with reference no. 52). Similarly, any response message communicated from cloud B to the cloud adapter for cloud B (e.g., cloud adapter B with reference no. 44) will be converted to a non-cloud-specific message prior to being handed off to the message dispatcher 28 for further processing.

In contrast to a conventional cloud management module configured as a customer-facing front-end for a single cloud, the multi-cloud management module 22 includes a variety of processing modules (e.g., processing modules 30, 32, 34, 36 and 38). These processing modules allow third-party cloud-based services to be better integrated with existing enterprise infrastructure. For example, the user management module 30 of the multi-cloud management module may include user and/or group privileges information. Consequently, an enterprise's existing user management policy may be utilized in determining which users are authorized to execute various administrative and provisioning commands facilitated by the multi-cloud management module 22. Furthermore, processing modules enable business logic to be utilized in determining who (e.g., which users or departments) should be allowed to provision, access and/or utilize the on-demand cloud-based computing resources offered by a third-party cloud, and when (e.g., day and time) these third-party computing resources are to be provisioned, accessed and/or utilized, if at all. In general, one or more predefined conditions associated with one of the processing modules can be evaluated prior to allowing a particular cloud-based computing resource to be provisioned, or prior to allowing a particular user-initiated request to be processed.

In one embodiment of the invention, the user management module 30 may specify user privileges or define some other condition which determines if and when a particular resource can be provisioned by a particular user. For example, user privileges information established as part of an enterprise's existing user management policy can be accessed by via the user management module 30. Accordingly, prior to processing a particular request, the multi-cloud management module 22 may verify that a user is allowed to execute a particular provisioning or administrative command. Accordingly, the right to provision cloud-based computing resources can be controlled by the enterprise's existing user management policy.

In another example, in one embodiment of the invention, the resource management module 32 may include one or more rules or predefined conditions which determine when a third-party cloud-based computing resource is to be used instead of or as a substitute for an enterprise-maintained computing resource. The predefined condition may, for example, indicate that a third-party cloud-based computing resource is to be provisioned and/or utilized only during certain days or times, or, only when a processing load of an enterprise-maintained computing resource exceeds some predefined load threshold. Accordingly, when a user requests that a particular resource be granted, a user may automatically be directed to a third-party cloud-based computing resource only when the less expensive enterprise resources are not available due to an excessive processing load. By implementing a proper set of business rules within the various processing modules, an enterprise can more intelligently leverage third-party cloud-based computing resources, thereby improving overall processing efficiency while ultimately saving money.

In one embodiment of the invention, the resource management module 32 will include one or more resource schedules indicating the times that certain cloud-based computing resources are allowed to be provisioned, accessed and/or utilized. The schedules may be provided on a per-user or per-department basis, such that the times when certain cloud-based computing resources can be provisioned may differ from user to user, or by department. In addition, the resource management module 32 may include a means for automatically managing the provisioning of certain cloud-based computing resources. For instance, a schedule maintained by, or included with, the resource management module 32 may indicate the exact days and/or times when a particular cloud-based computing resource is to be provisioned for use by a particular user or group. Accordingly, the multi-cloud management module 22, in one embodiment of the invention, may automatically initiate or start a cloud-based resource, and automatically stop or terminate a resource according to a schedule. For example, the multi-cloud management module 22 may automatically instantiate an instance of a particular virtual server on a particular cloud, for use by a certain user or group of users, based on a schedule included with or maintained by the resource management module 32. Similarly, the multi-cloud management module may automatically terminate or suspend a virtual server executing on a particular cloud based on a schedule. If, for example, a certain amount of time (e.g., 8 hours) has passed after a particular cloud-based computing resource was first provisioned, the multi-cloud management module 22 may suspend or terminate the computing resource.

The resource management module 32 may also track and monitor which cloud-based computing resources have been provisioned. Accordingly, a user-initiated request to display information about all cloud-based resources, or cloud-based resources associated with a particular cloud, can be processed by the resource management module, and the appropriate information displayed to the user. In one embodiment of the invention, such a request is relayed from the resource management module 32 to one or more of the cloud adapters, which translate the non-cloud-specific command and forward the appropriate provisioning commands to the individual cloud management modules of the clouds. In this way, the individual clouds can be polled for the status of any cloud-based computing resource provisioned by the multi-cloud management module.

In one embodiment of the invention, the configuration management module 34 keeps track of various configuration parameters associated with different cloud-based computing resources. For instance, in some cases, certain cloud-based computing resources may require that certain configuration settings be provided when the resource is initially provisioned. The configuration management module 34 may keep track of these configuration settings, and in one embodiment, request or prompt for the configuration settings as part of the interaction that occurs with the user interface when a user is requesting that a cloud-based computing resource be provisioned. Similarly, a user may utilize information about certain cloud-based resources that are maintained by the configuration management module when the user is initially provisioning the resource.

In one embodiment of the invention, the provisioning module 36 communicates the provisioning commands from the multi-cloud management module 22 to the individual clouds. For example, after a particular cloud adapter has converted a user-initiated request from a non-cloud-specific command to a cloud-specific command (e.g., a command compatible with the API of a particular cloud), the provisioning component may forward the provisioning command(s) to the appropriate cloud—or more specifically, to the interface component of the cloud management module of the appropriate cloud.

In one embodiment of the invention, the multi-cloud management module 22 includes a suspend/resume module 38. In some cases, a particular cloud may not support the ability to suspend a particular resource (e.g., a virtual server), and later resume that resource in the same state that the resource was in at the time it was suspended. Accordingly, in one embodiment of the invention, the multi-cloud management module 22 includes a suspend/resume module 38 that enables a user to request that a particular cloud-based computing resource be suspended—preserving its state—and then resumed at a later time. Moreover, in one embodiment of the invention the multi-cloud management module 22 facilitates the suspending of a particular cloud-based resource on one cloud, and resuming the same resource on a second, different, cloud. This is accomplished by analyzing the cloud-based resource when the suspend request is received to identify and save the information pertinent to preserving the resources state. This state information is then saved by the multi-cloud management module 22. Accordingly, if necessary, the multi-cloud management module 22 can generate the necessary provisioning commands to resume the cloud-based computing resource on a cloud other than the cloud on which the cloud-based resources was initially suspended.

Figure 3:
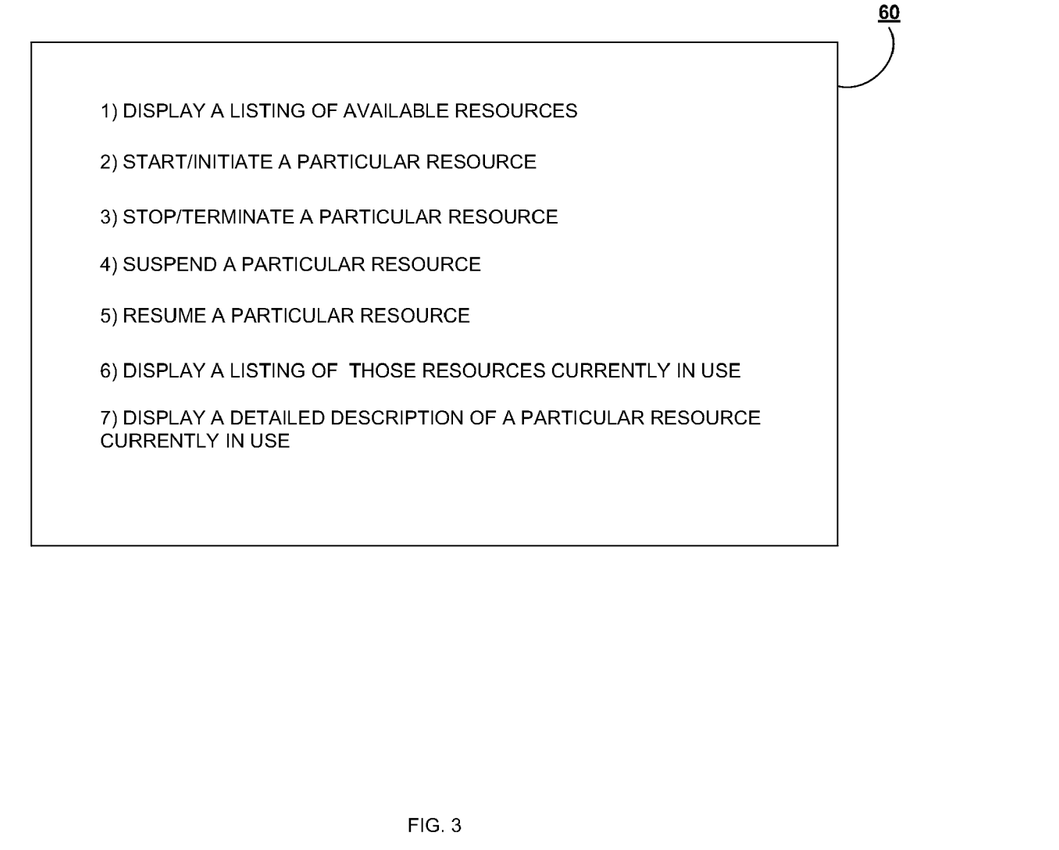
FIG. 3 illustrates a non-exhaustive list of the various administrative and provisioning commands enabled by a multi-cloud management module, according to an embodiment of the invention.

In one embodiment of the invention, the multi-cloud management module 22 facilitates a variety of provisioning and administrative functions. For example, FIG. 3 illustrates a non-exhaustive list 60 of the types of functions enabled by the multi-cloud management module 22. As illustrated in FIG. 3, in one embodiment of the invention, the multi-cloud management module 22 provides a mechanism by which a user can request that all available cloud-based resources be displayed. Accordingly, in one embodiment of the invention, a listing of the machine images which can be instantiated on the various clouds may be displayed. In one embodiment of the invention, each resource (e.g., an image associated with a virtual server or appliance) may be displayed to the user, grouped according to the cloud on which it can be instantiated. Alternatively, in one embodiment of the invention, certain resources may be cloud independent, meaning that the resource can be provisioned on multiple clouds. In this case, a user may select a resource without knowing, or caring, where the particular resource is to be provisioned. For example, a user may select a particular virtual server or appliance without regard for which cloud the virtual server or appliance is to execute on.

As illustrated in FIG. 3, the multi-cloud management module 22 also enables a user to initiate (start) or terminate (stop) a particular resource. For example, a user may select a particular machine image representing a virtual server or appliance, and opt to have an instance of that virtual server or appliance instantiated on a particular cloud. Likewise, the user may at some point desire to stop or terminate a previously instantiated instance of a virtual server or appliance. In one embodiment of the invention, provisioning commands may be automatically generated in accordance with one or more business rules, such that a particular cloud-based computing resource is automatically started or stopped, according to a predefined schedule, or as certain conditions are observed.

As described above, in one embodiment of the invention, the multi-cloud management module 22 enables a user to suspend and/or resume a particular cloud-based computing resource. Additionally, a user may request to view a listing of all cloud-based resources that are currently provisioned and in use. Finally, in one embodiment of the invention, a user may request to view detailed information about one particular cloud-based resource that is currently in use. Such detailed information may include information about the cost incurred for using the resource, the duration of time the resource has been in use, or a measure of processing and/or storage resources used by the particular cloud-based resource.

Figure 4:
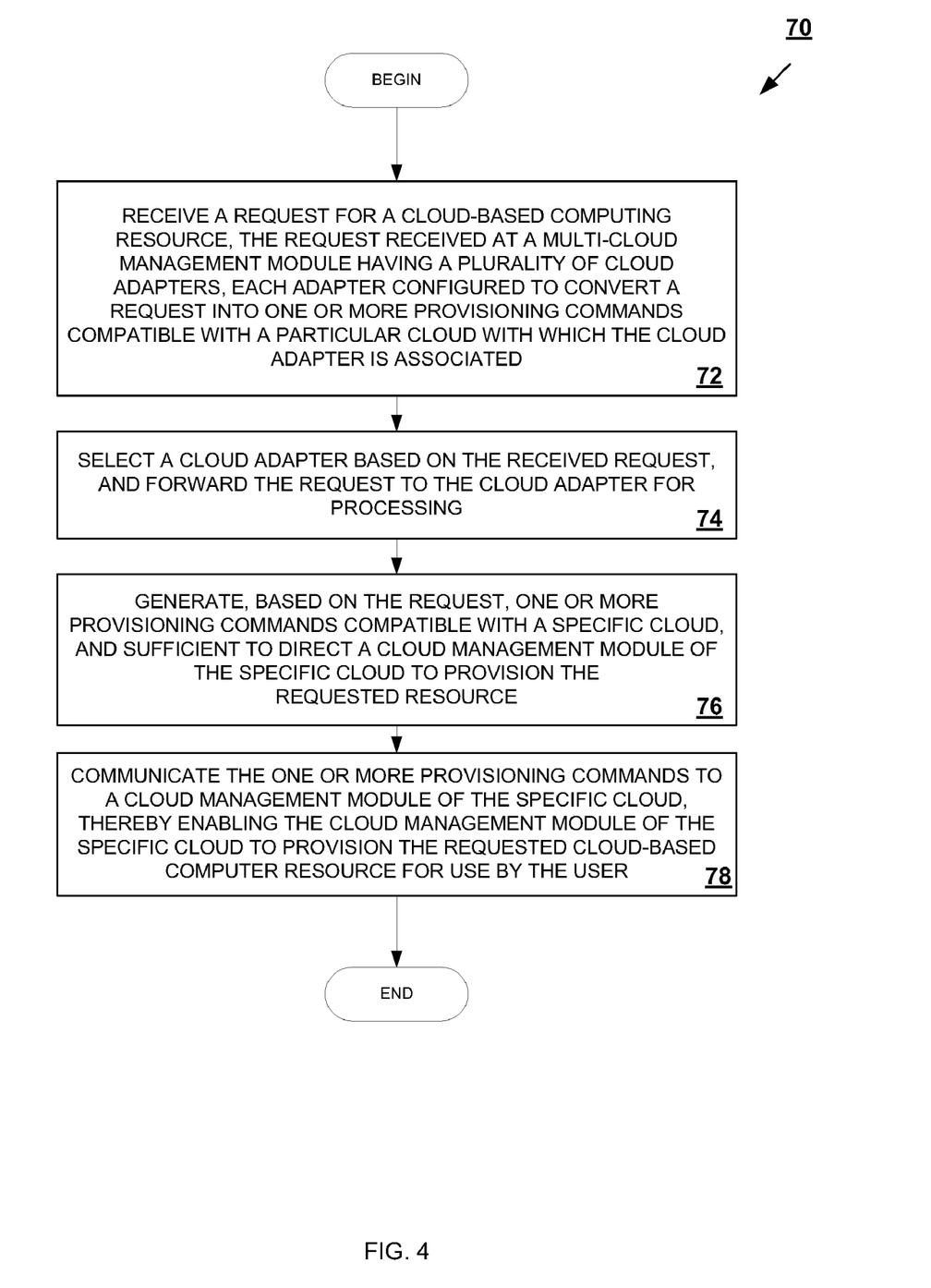
FIG. 4 illustrates a method, according to an embodiment of the invention, for utilizing a multi-cloud management module to instantiate an instance of a virtual server or virtual appliance in a cloud, according to an embodiment of the invention.

FIG. 4 illustrates a method 70, according to an embodiment of the invention, for leveraging cloud-based computing resources with a multi-cloud management module. As illustrated in FIG. 4, the method begins at operation 72 when a multi-cloud management module receives a user-initiated request for a cloud-based computing resource. The multi-cloud management module provides a common interface for a plurality of clouds, each having its own administrative interface and associated API.

Next, at operation 74, a cloud adapter is selected based on the request. For example, the request is analyzed to determine which cloud the request is directed to. Accordingly, a cloud adapter is identified for the cloud to which the request is directed.

At method operation 76, a cloud adapter for a particular cloud generates one or more provisioning commands compatible with the cloud management module of the particular cloud. For example, the request, which is initially received in a non-cloud-specific format is converted into one or more provisioning commands that are compatible with the particular cloud to which the request is ultimately directed. Finally, at method operation 78, the cloud-specific provisioning command(s) are communicated from the multi-cloud management module to the specific cloud, thereby enabling the cloud management module of the specific cloud to execute the provisioning commands and provision the appropriate cloud-based computing resource.

Figure 5:
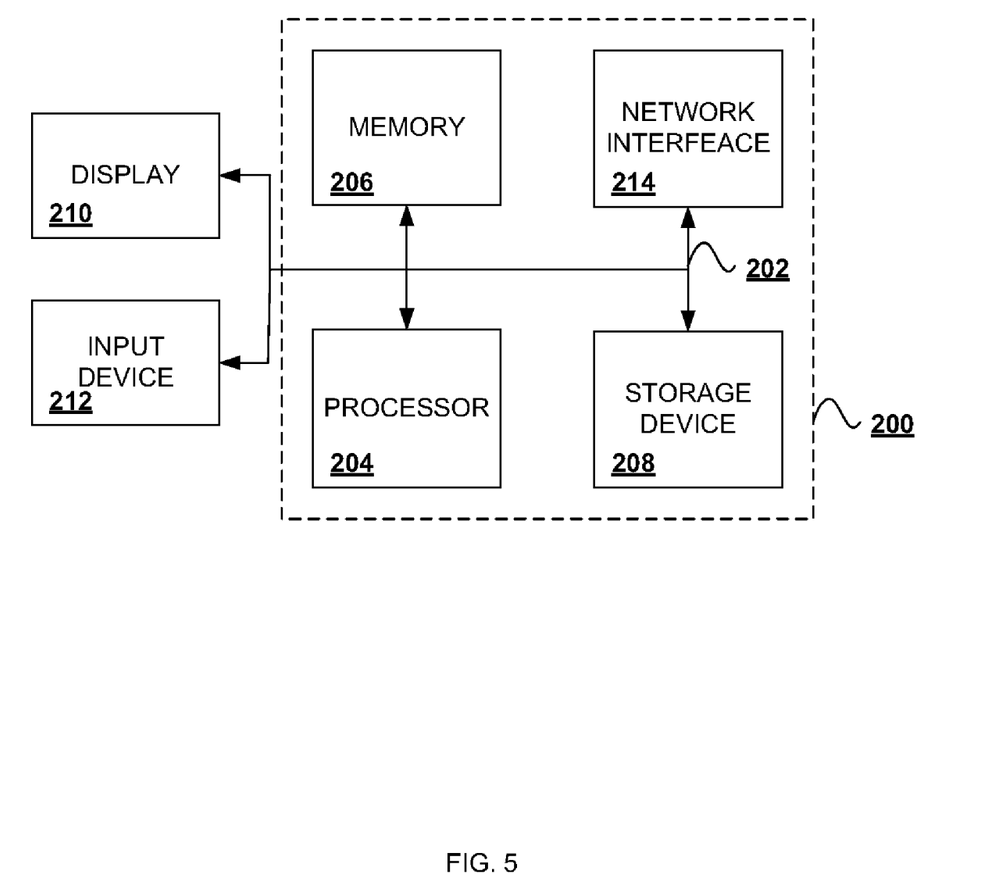
FIG. 5 is a block diagram of an example computer system, which might be utilized to implement various embodiments of the present invention.

FIG. 5 is a block diagram of an example computer system 200, which might be utilized to implement various embodiments of the present invention. Computer system 200 includes a bus 202 or other communication mechanism for communicating information, and a processor 204 coupled with bus 202 for processing information. Computer system 200 also includes a memory 206 coupled to bus 202 for storing information and instructions to be executed by processor 204, including information and instructions for performing the methods and techniques described above. This memory may also be used for storing temporary variables or other intermediate processing information during execution of instructions to be executed by processor 204. Possible implementations of this memory may be, but are not limited to, random access memory (RAM), read only memory (ROM), or both. A non-volatile mass storage device 208 is also provided for storing information and instructions. Common forms of storage devices include, for example, a hard drive, a magnetic disk, an optical disk, a CD-ROM, a DVD, a flash memory, a USB memory card, a solid state drive or any other medium from which a computer can read. Storage device 208 may include source code, binary code, or software files for performing the methods and/or techniques described above, or for embodying the constructs above, for example.

Computer system 200 may be coupled via bus 202 (or another bus) to a display 210, such as a cathode ray tube (CRT), liquid crystal display (LCD), or organic light emitting diode (OLED) display for displaying information to a computer user. An input device 212 such as a keyboard and/or mouse is coupled to bus 202 for communicating information and command selections from the user to processor 204. The combination of these components allows the user to communicate with the system. In some systems, bus 202 may be divided into multiple specialized buses.

Computer system 200 also includes a network interface 214 coupled with bus 202. Network interface 214 may provide two-way data communication between computer system 200 and a local area network (LAN). The network interface 214 may be a digital subscriber line (DSL) or other modem device to provide a data communication connection over a telephone line, for example. Another example of the network interface is a network interface card (NIC) to provide a data communication connection to a compatible LAN. Wireless communication links may also be established, for example, with a wireless network interface card. In any such implementation, network interface 214 sends and receives electrical, electromagnetic, or optical signals that carry digital data streams representing various types of information.

Computer system 200 can send and receive information, including messages or other interface actions, through the network interface 214 to a private or public intranet or internet. In the internet example, software components or services may reside on multiple different computer systems or servers across the network. A server may transmit actions or messages from one component, through an internet, local network, and/or network interface 214 to a component on computer system 200.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
    receiving, at a multi-cloud management module, a user-initiated request for a cloud-based computing resource associated with a particular cloud, wherein the multi-cloud management module provides a common administrative interface for provisioning cloud-based computing resources associated with a plurality of clouds having heterogeneous administrative interfaces;
    generating, based on the user-initiated request, one or more provisioning commands compatible with the particular cloud and sufficient to direct a cloud management module of the particular cloud to provision the requested cloud-based computing resource on the particular cloud; and
    communicating the one or more provisioning commands to a cloud management module of the particular cloud so as to enable the cloud management module of the particular cloud to provision the requested cloud-based computing resource for use by the requesting user,
    wherein the user-initiated request corresponds to a non-cloud-specific message, and wherein generating the one or more provisioning commands includes translating the non-cloud-specific message into a cloud-specific message, and
    wherein generating the one or more provisioning commands includes evaluating a plurality of business logic, wherein the non-cloud-specific message is translated into the cloud-specific message according to at least one of privileges information, conditions information and scheduling information in the plurality of business logic, wherein the conditions information determines when a third-party cloud-based computing resource is to be used instead of an enterprise-maintained computing resource, and wherein the scheduling information determines when a third-party cloud-based computing resource is to be used instead of an enterprise-maintained computing resource.

2. The computer-implemented method of claim 1, wherein the user-initiated request for a cloud-based computing resource associated with a particular cloud is a request for a virtual server, and the one or more provisioning commands cause a cloud management module of the particular cloud to instantiate an instance of a machine image representing the virtual server on one or more physical servers of the particular cloud.

3. The computer-implemented method of claim 2, wherein generating one or more provisioning commands compatible with the particular cloud includes selecting a cloud adapter associated with the particular cloud from a plurality of cloud adapters configured for use by the multi-cloud management module, each cloud adapter associated with a cloud and configured to convert a user-initiated request received at the multi-cloud management module into one or more provisioning commands compatible with a cloud management module of the cloud with which the cloud adapter is associated.

4. The computer-implemented method of claim 2, further comprising:
    receiving a request to suspend a virtual server operating on a physical server of a first cloud;
    determining, and saving, data necessary to resume the virtual server on a physical server of the first cloud or a physical server of a second cloud, wherein the second cloud differs from the first cloud.

5. The computer-implemented method of claim 1, wherein receiving a user-initiated request for a cloud-based computing resource associated with a particular cloud includes receiving a user-initiated request for a cloud-based computing resource associated with an enterprise-maintained cloud, the method further comprising:
    determining whether one or more predefined conditions are satisfied; and
    if the one or more predefined conditions are satisfied:
        generating, based on the user-initiated request, one or more provisioning commands compatible with a third-party cloud and sufficient to direct a cloud management module of the third-party cloud to provision the requested cloud-based computing resource on the third-party cloud; and
        communicating the one or more provisioning commands to a cloud management module of the third-party cloud so as to enable the cloud management module of the third-party cloud to provision the requested cloud-based computing resource for use by the requesting user.

6. The computer-implemented method of claim 5, wherein one of the predefined conditions is satisfied when i) a processing load on the enterprise-maintained cloud exceeds a predetermined processing load threshold, ii) a resource schedule indicates the requested cloud-based computing resource on the enterprise-maintained cloud is not to be provisioned or utilized during the time period during which the user-initiated request is received, or iii) the user responsible for initiating the request is not authorized to provision the cloud-based computing resource on the enterprise-maintained cloud.

7. The computer-implemented method of claim 1, further comprising:
receiving, at a multi-cloud management module, a user-initiated request to display a list of available cloud-based computing resources that can be provisioned by the multi-cloud management module;
generating a list of available computing resources by reading from a resource library those resources that have been registered with the multi-cloud management module, wherein registration with the multi-cloud management module indicates the cloud-based computing resource is associated with an available cloud adapter configured for use by the multi-cloud management module and can be provisioned by means of the multi-cloud management module; and
displaying the list of available cloud-based computing resources to a user.

8. The computer-implemented method of claim 1, further comprising:
receiving, at a multi-cloud management module, a user-initiated request to display a list of cloud-based computing resources currently in use, the cloud-based computing resources associated with any one of a plurality of clouds configured for use with the multi-cloud management module;
generating a list of cloud-based computing resources currently in use, wherein the list includes cloud-based resources associated with one or more of the clouds configured for use with the multi-cloud management module; and
displaying the list of cloud-based computing resources that are currently in use to a user.

9. The computer-implemented method of claim 1, further comprising:
receiving a request to suspend a virtual server operating on a physical server of a first cloud;
generating a second provisioning command to resume the virtual server on a physical server of a second cloud, wherein the second cloud differs from the first cloud, and wherein the second provisioning command to resume the virtual server on the second cloud is generated according to the heterogeneous administrative interfaces of the second cloud and the first cloud; and
resuming the virtual server on the physical server of the second cloud.

10. The computer-implemented method of claim 1, further comprising:
storing a plurality of business rules including a first plurality of business rules relating to a first cloud and a second plurality of business rules related to a second cloud;
generating a first command from the first plurality of business rules to provision the first cloud, and generating a second command from the second plurality of business rules to provision the second cloud, wherein the first command and the second command differ in accordance with the heterogeneous administrative interfaces of the first cloud and the second cloud; and provisioning the first cloud according to the first command, and provisioning the second cloud according to the second command.

11. The computer-implemented method of claim 1, further comprising:
receiving a request to suspend a virtual server operating on a physical server of a first cloud, wherein the first cloud lacks an ability to resume the virtual server on a second cloud, wherein the second cloud differs from the first cloud;
generating a second provisioning command to resume the virtual server on the physical server of a second cloud, wherein the second provisioning command to resume the virtual server on the second cloud is generated according to the heterogeneous administrative interfaces of the second cloud and the first cloud; and
resuming the virtual server on the physical server of the second cloud.

12. The computer-implemented method of claim 1, wherein the heterogeneous administrative interfaces include a first application programming interface associated with a first cloud and a second application programming interface associated with a second cloud, wherein the first application programming interface differs from the second application programming interface in accordance with the heterogeneous administrative interfaces.

13. The computer-implemented method of claim 1, wherein the heterogeneous administrative interfaces include a first provisioning interface associated with a first cloud and a second provisioning interface associated with a second cloud, wherein the first provisioning interface differs from the second provisioning interface in accordance with the heterogeneous administrative interfaces, wherein a first application programming interface implements the first provisioning interface, wherein a second application programming interface implements the second provisioning interface, and wherein the first application programming interface differs from the second application programming interface in accordance with the heterogeneous administrative interfaces.

14. The computer-implemented method of claim 1, wherein the plurality of clouds includes a first cloud implemented by a first virtualization software and a second cloud implemented by a second virtualization software, wherein the first virtualization software differs from the second virtualization software in accordance with the heterogeneous administrative interfaces.

15. The computer-implemented method of claim 1, further comprising:
receiving a second user-initiated request that corresponds to a second non-cloud-specific message;
generating a second set of one or more provisioning commands, including translating the second non-cloud-specific message into a second cloud-specific message, wherein the second cloud-specific message differs from the cloud-specific message in accordance with the heterogeneous administrative interfaces; and
communicating the second set of one or more provisioning commands to a second cloud management module associated with a second particular cloud.

16. A system comprising:
a multi-cloud management module that resides and executes on a physical server and that is configured to receive a user-initiated request for a cloud-based computing resource associated with any one of a plurality of clouds configured for use with the multi-cloud management module, wherein the multi-cloud management module provides a common administrative interface for provisioning cloud-based computing resources associated with any one of the plurality of clouds having heterogeneous administrative interfaces; and a dispatcher configured to dispatch a user-initiated request to one of a plurality of cloud adapters, wherein each cloud adapter is associated with a particular cloud and is configured to generate, based on the user-initiated request, one or more provisioning commands compatible with the particular cloud with which the cloud adapter is associated, wherein the one or more provisioning commands are sufficient to direct a cloud management module of the particular cloud to provision the requested cloud-based computing resource on the particular cloud, wherein the user-initiated request corresponds to a non-cloud-specific message, and wherein to generate the one or more provisioning commands includes to translate the non-cloud-specific message into a cloud-specific message, and wherein each cloud adapter is configured to generate the one or more provisioning commands by evaluating a plurality of business logic, wherein the non-cloud-specific message is translated into the cloud-specific message according to at least one of privileges information, conditions information and scheduling information in the plurality of business logic, wherein the conditions information determines when a third-party cloud-based computing resource is to be used instead of an enterprise-maintained computing resource, and wherein the scheduling information determines when a third-party cloud-based computing resource is to be used instead of an enterprise-maintained computing resource.

17. The system of claim 16, further comprising:

a suspend/resume module configured to determine, and save, data necessary to resume a virtual server on a physical server of a first cloud or a second cloud, wherein the second cloud differs from the first cloud, when the multi-cloud management module receives a request to suspend a virtual server operating on a physical server of the first cloud.

18. The system of claim 16, further comprising:

a resource management module configured to determine whether one or more predefined conditions are satisfied when a user-initiated request for a cloud-based computing resource associated with an enterprise-maintained cloud is received at the multi-cloud management module;

wherein, if the one or more predefined conditions are satisfied, the resource management modules is configured to:

generate, based on the user-initiated request, one or more provisioning commands compatible with a third-party cloud and sufficient to direct a cloud management module of the third-party cloud to provision the requested computing resource on the third-party cloud; and communicate the one or more provisioning commands to the cloud management module of the third-party cloud so as to enable the cloud management module of the third-party cloud to provision the requested computing resource for use by the requesting user.

19. The system of claim 16, wherein the heterogeneous administrative interfaces include a first application programming interface associated with a first cloud and a second application programming interface associated with a second cloud, wherein the first application programming interface differs from the second application programming interface in accordance with the heterogeneous administrative interfaces.

20. The system of claim 16, wherein the heterogeneous administrative interfaces include a first provisioning interface associated with a first cloud and a second provisioning interface associated with a second cloud, wherein the first provisioning interface differs from the second provisioning interface in accordance with the heterogeneous administrative interfaces, wherein a first application programming interface implements the first provisioning interface, wherein a second application programming interface implements the second provisioning interface, and wherein the first application programming interface differs from the second application programming interface in accordance with the heterogeneous administrative interfaces.

21. The system of claim 16, wherein the plurality of clouds includes a first cloud implemented by a first virtualization software and a second cloud implemented by a second virtualization software, wherein the first virtualization software differs from the second virtualization software in accordance with the heterogeneous administrative interfaces.

22. A non-transitory computer-readable medium having instructions thereon, which, when executed by a computer, cause the computer to perform a method, the method comprising:

receiving, at a multi-cloud management module, a user-initiated request for a cloud-based computing resource associated with a particular cloud, wherein the multi-cloud management module provides a common administrative interface for provisioning cloud-based computing resources associated with a plurality of clouds having heterogeneous administrative interfaces;

generating, based on the user-initiated request, one or more provisioning commands compatible with the particular cloud and sufficient to direct a cloud management module of the particular cloud to provision the requested cloud-based computing resource on the particular cloud; and communicating the one or more provisioning commands to a cloud management module of the particular cloud so as to enable the cloud management module of the particular cloud to provision the requested cloud-based computing resource for use by the requesting user, wherein the user-initiated request corresponds to a non-cloud-specific message, and wherein generating the one or more provisioning commands includes translating the non-cloud-specific message into a cloud-specific message, and wherein generating the one or more provisioning commands includes evaluating a plurality of business logic, wherein the non-cloud-specific message is translated into the cloud-specific message according to at least one of privileges information, conditions information and scheduling information in the plurality of business logic, wherein the conditions information determines when a third-party cloud-based computing resource is to be used instead of an enterprise-maintained computing resource, and wherein the scheduling information determines when a third-party cloud-based computing resource is to be used instead of an enterprise-maintained computing resource.

* * * * *